United States Patent
Morimura et al.

(10) Patent No.: US 12,286,055 B2
(45) Date of Patent: Apr. 29, 2025

(54) ANNUNCIATION METHOD, ANNUNCIATION DEVICE, AND STORAGE MEDIUM

(71) Applicant: TOYOTA JIDOSHA KABUSHIKI KAISHA, Toyota (JP)

(72) Inventors: Junichi Morimura, Shizuoka-ken (JP); Satoshi Omi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 18/108,700

(22) Filed: Feb. 13, 2023

(65) Prior Publication Data

US 2023/0294598 A1  Sep. 21, 2023

(30) Foreign Application Priority Data

Mar. 18, 2022 (JP) .................. 2022-043706

(51) Int. Cl.
*B60Q 1/50* (2006.01)
(52) U.S. Cl.
CPC .................. *B60Q 1/525* (2013.01)
(58) Field of Classification Search
CPC ..................................................... B60Q 1/525
See application file for complete search history.

(56) References Cited

U.S. PATENT DOCUMENTS

| | | | |
|---|---|---|---|
| 2015/0329043 A1* | 11/2015 | Skvarce | B60W 30/085 340/435 |
| 2017/0182934 A1 | 6/2017 | Arita et al. | |
| 2017/0337821 A1 | 11/2017 | Masuda et al. | |
| 2018/0079359 A1 | 3/2018 | Park et al. | |
| 2018/0141484 A1 | 5/2018 | Haneda et al. | |
| 2018/0272929 A1 | 9/2018 | Krahnstöver | |
| 2020/0211396 A1 | 7/2020 | Morimura et al. | |
| 2021/0114514 A1 | 4/2021 | Karol | |

FOREIGN PATENT DOCUMENTS

| | | |
|---|---|---|
| EP | 1659029 B1 | 7/2008 |
| EP | 3192698 A1 | 7/2017 |
| EP | 3333016 A1 | 6/2018 |
| GB | 2531084 A | 4/2016 |
| JP | 2012-051570 A | 3/2012 |
| JP | 2016-055691 A | 4/2016 |
| JP | 2016-085563 A | 5/2016 |
| JP | 2020-015474 A | 1/2020 |
| JP | 2020-107163 A | 7/2020 |
| WO | 2016/035118 A1 | 3/2016 |

* cited by examiner

*Primary Examiner* — Daryl C Pope
(74) *Attorney, Agent, or Firm* — Dinsmore & Shohl LLP

(57) ABSTRACT

A potential collision risk between a vehicle and a potential traffic participant predicted to be present ahead in a direction of travel of the vehicle is foreseen. A first annunciation is performed notifying those in a vicinity that the vehicle is traveling, using an externally-directed annunciator installed in the vehicle, in response to the potential collision risk being foreseen. Note that when a manifested collision risk between the vehicle and a manifested traffic participant confirmed ahead in the direction of travel of the vehicle is sensed, a second annunciation notifying those in the vicinity regarding collision avoidance actions of the vehicle may be performed using the externally-directed annunciator. However, the first annunciation is prioritized over the second annunciation as long as the potential collision risk continues.

15 Claims, 11 Drawing Sheets

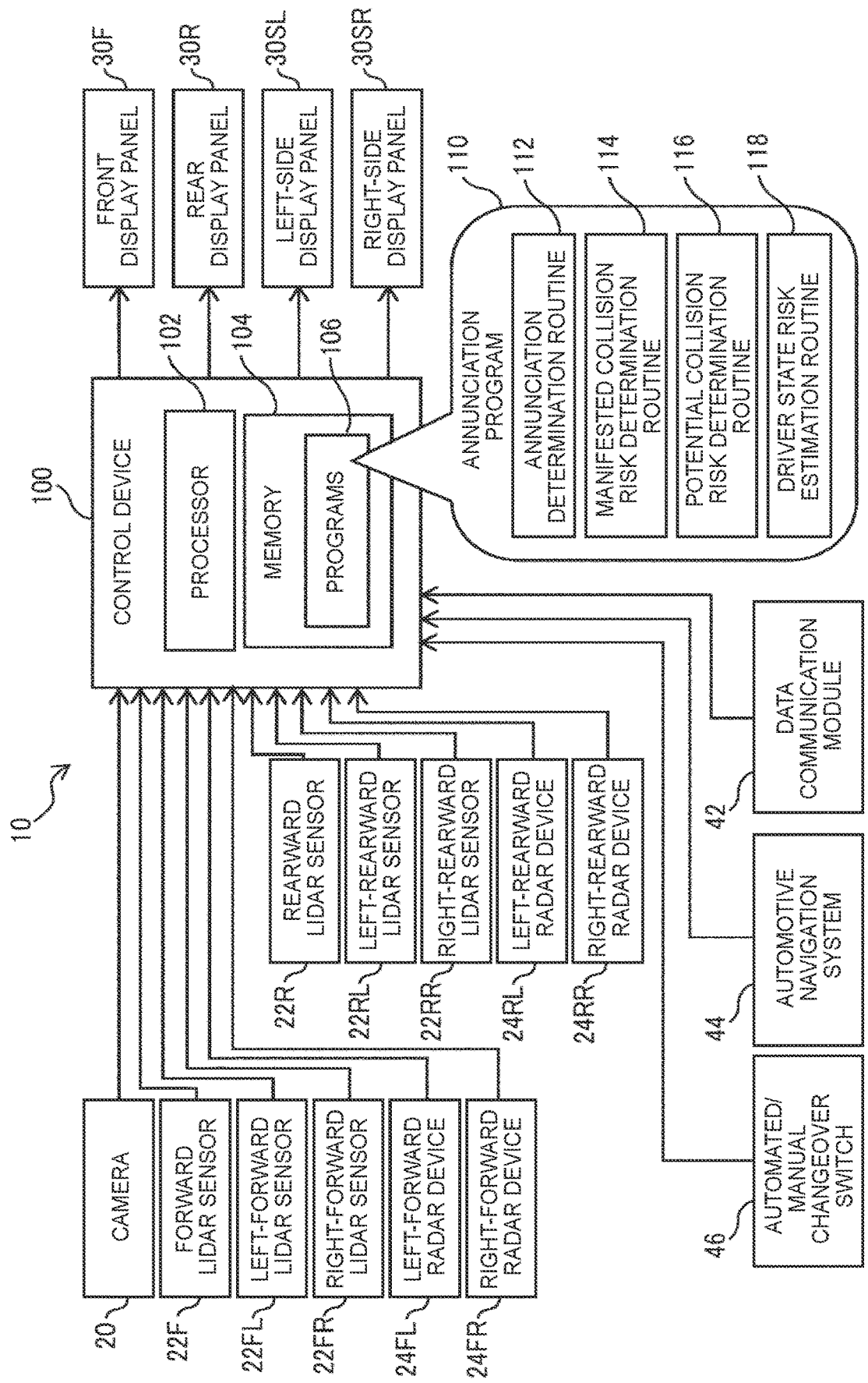

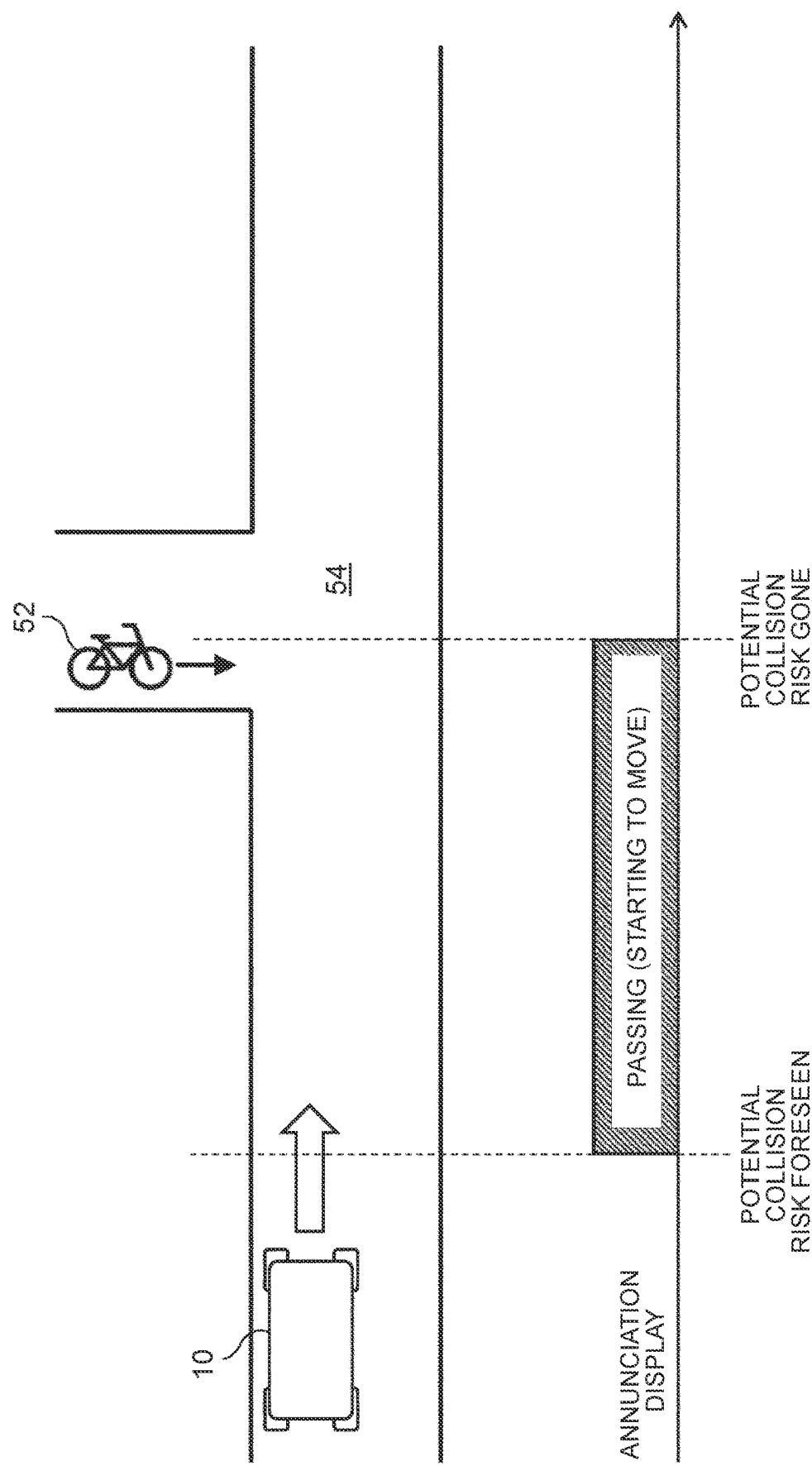

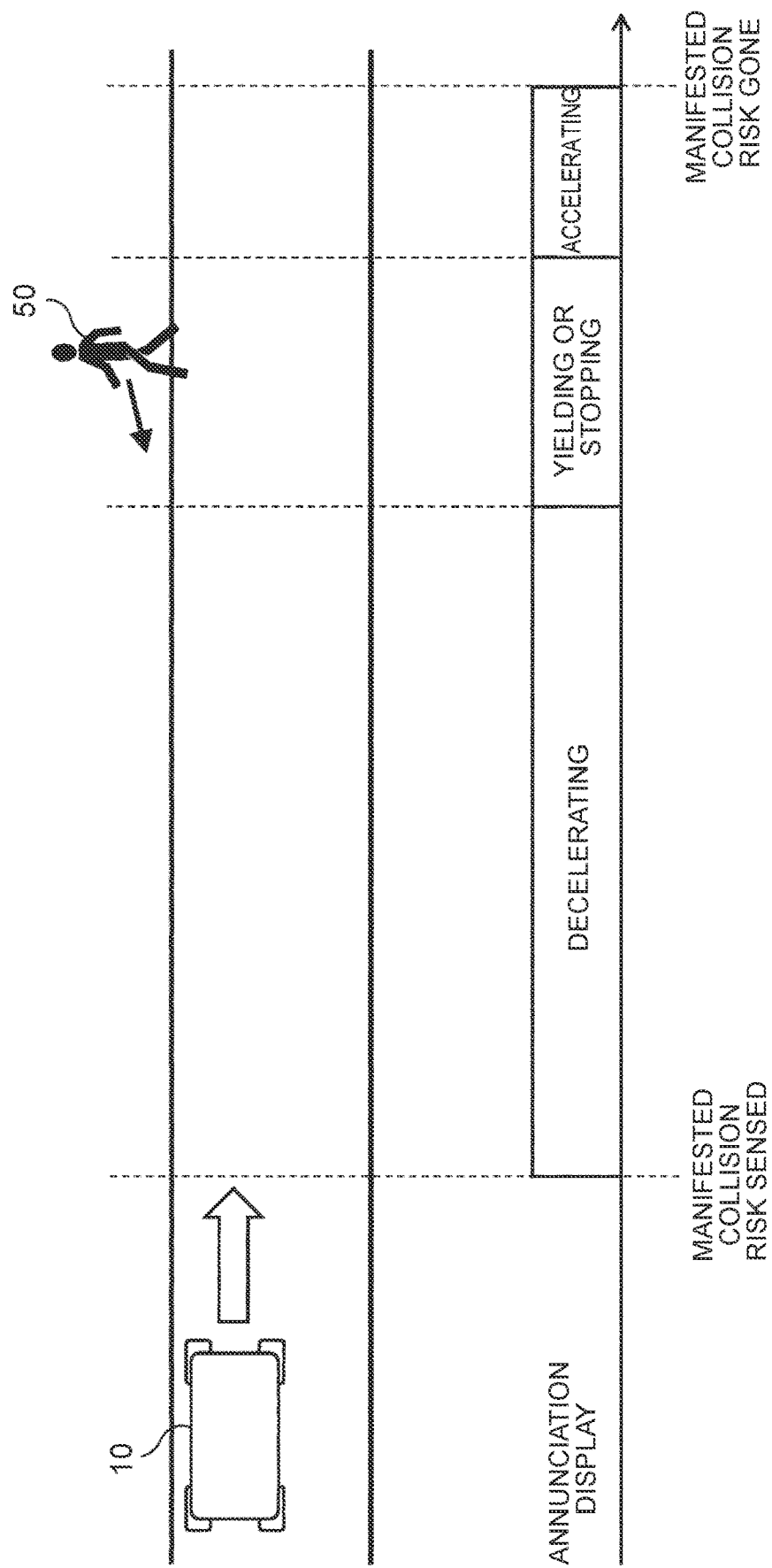

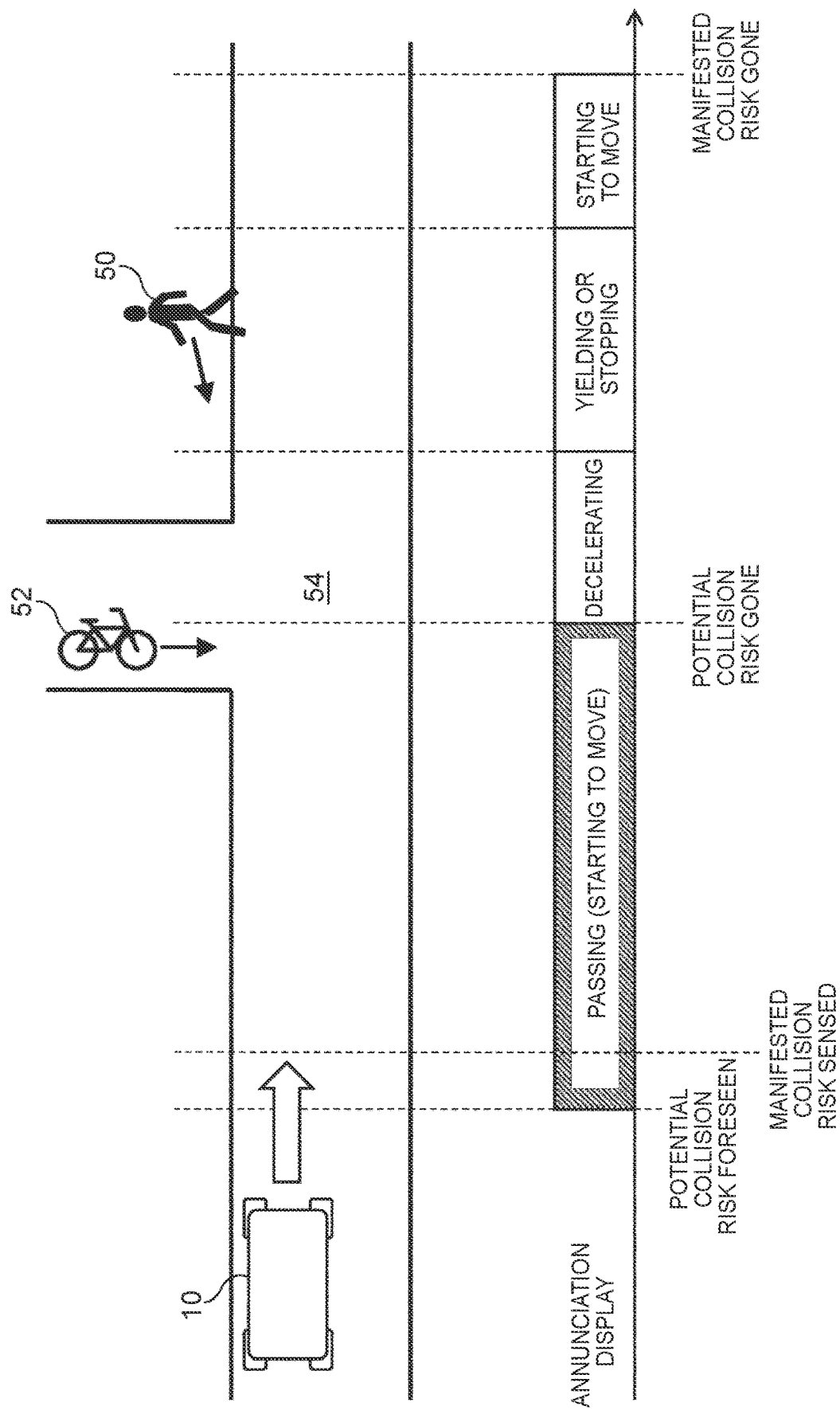

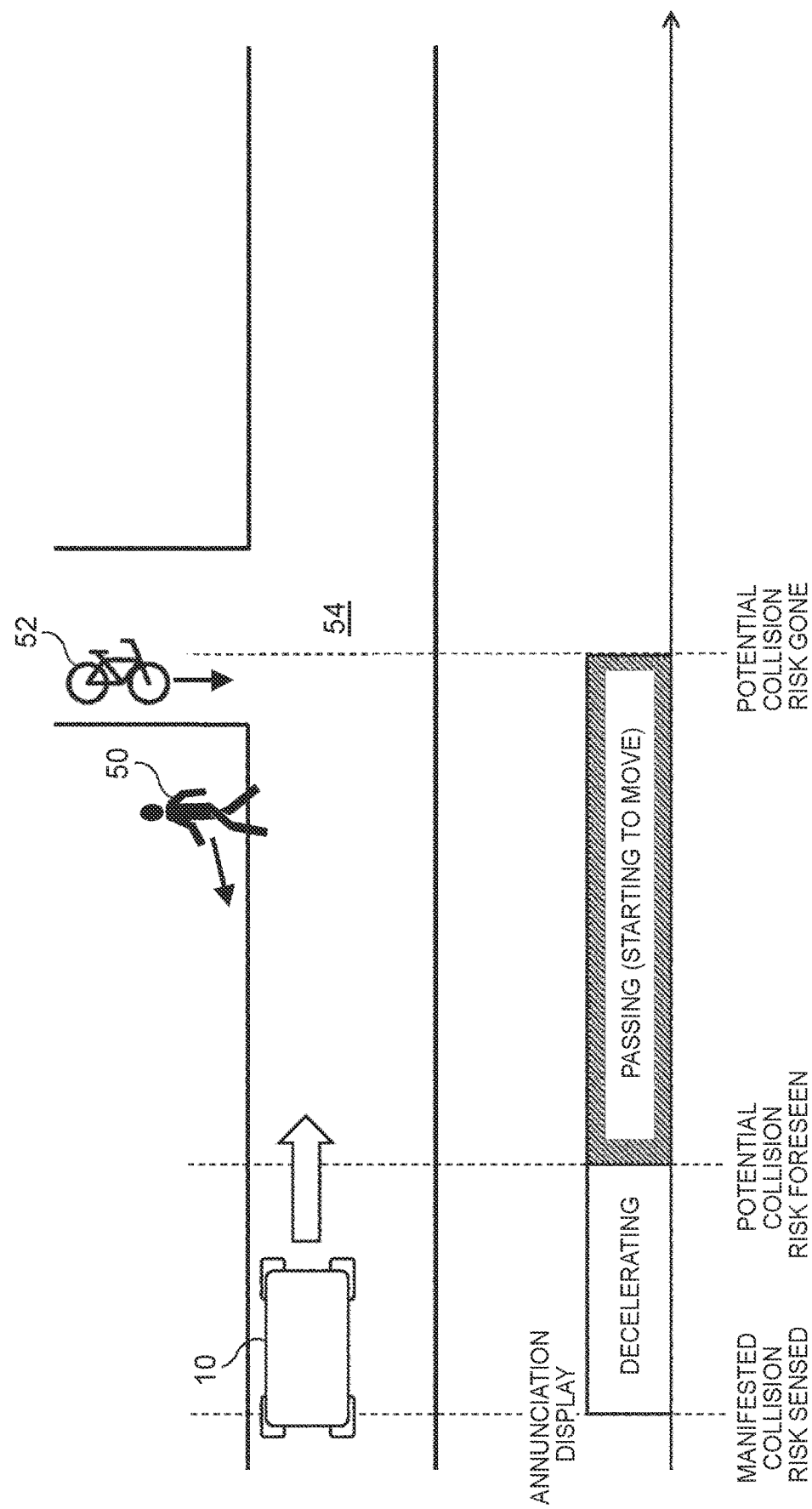

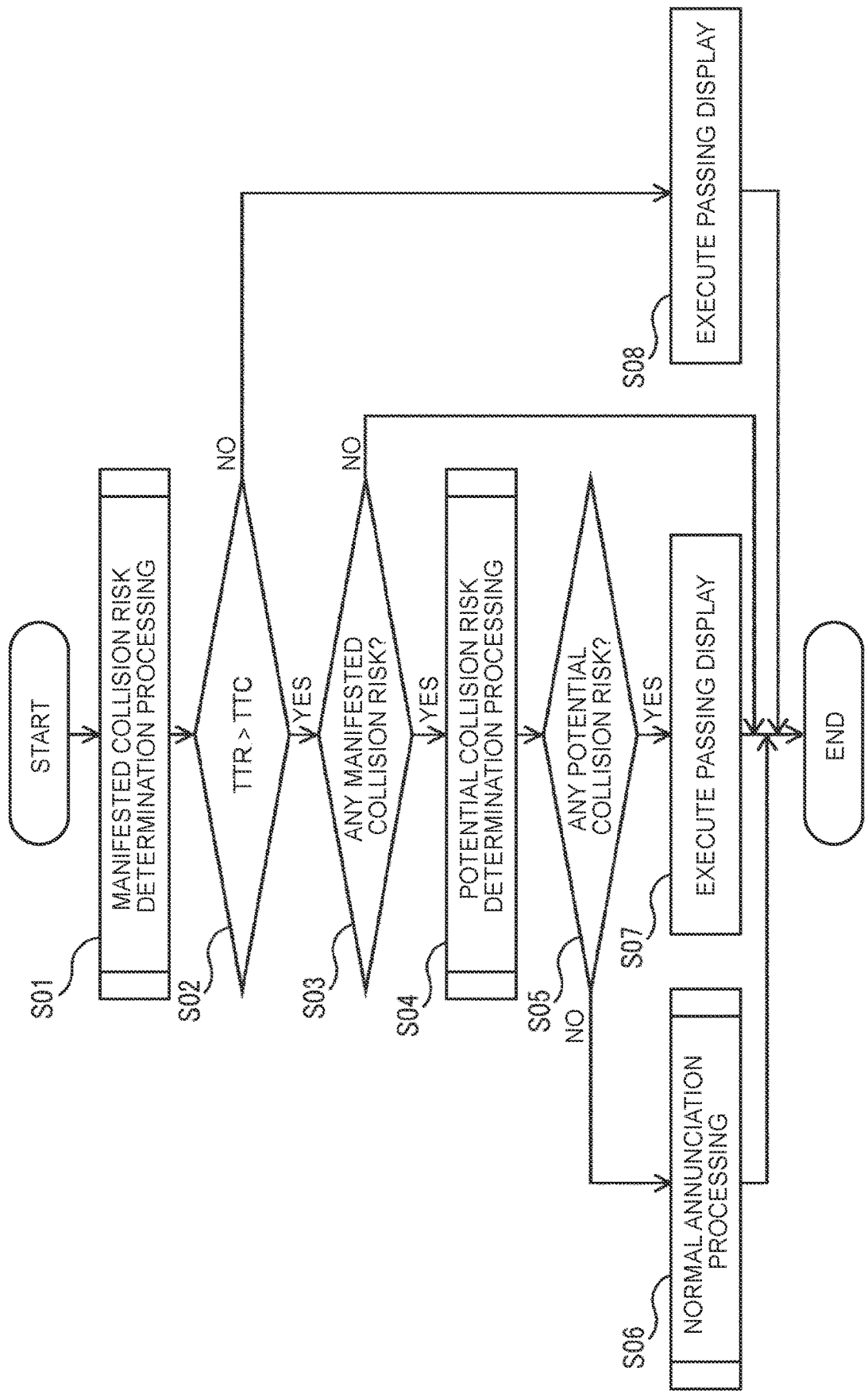

ANNUNCIATION METHOD, ANNUNCIATION DEVICE, AND STORAGE MEDIUM

CROSS-REFERENCE TO RELATED APPLICATION

This application claims priority to Japanese Patent Application No. 2022-043706 filed on Mar. 18, 2022, incorporated herein by reference in its entirety.

BACKGROUND

1. Technical Field

The present disclosure relates to an annunciation method of performing annunciation of state of actions of a vehicle to outside of the vehicle, using an annunciator installed in the vehicle, and also relates to the annunciation device and a storage medium.

2. Description of Related Art

GB Patent No. 2531084 proposes annunciation means for performing annunciation directed to pedestrians from an automated driving vehicle. Examples of the annunciation means that are proposed include colors, text messages, sounds, and so forth, and are described as being communication means for communication directed to pedestrians.

In addition to GB Patent No. 2531084, Japanese Unexamined Patent Application Publication No. 2020-107163 (JP 2020-107163 A) is exemplified as literature indicating technical levels in the technical field of the present disclosure or related technical fields, at the time of filing.

SUMMARY

Accidents are more likely to occur at intersections with limited visibility, and non-priority intersections. At least some of these accidents are collisions between vehicles and potential traffic participants that are not visible from the vehicles. A potential traffic participant becomes a manifested traffic participant by being sensed by a vehicle. However, it is not always easy for a traveling vehicle to avoid colliding with a traffic participant that suddenly appears.

The present disclosure provides technology that contributes to reducing collision accidents between vehicles and potential traffic participants that are not visible to the vehicles.

The present disclosure provides an annunciation method. The annunciation method according to the present disclosure includes foreseeing a potential collision risk between a vehicle and a potential traffic participant predicted to be present ahead in a direction of travel of the vehicle, and performing a first annunciation, using an externally-directed annunciator installed in the vehicle, in response to the potential collision risk being foreseen. The first annunciation is an annunciation for notifying those in the vicinity that the vehicle is traveling. By performing the first annunciation, when a potential traffic participant actually is present, the potential traffic participant can be made aware of the presence of the traveling vehicle.

The annunciation method according to the present disclosure may include sensing a manifested collision risk between the vehicle and a manifested traffic participant of which presence is confirmed ahead in the direction of travel of the vehicle, and performing a second annunciation using the externally-directed annunciator in response to the manifested collision risk being sensed. The second annunciation is an annunciation for notifying those in the vicinity with regard to collision avoidance actions of the vehicle. Performing the second annunciation reduces misunderstandings in communication between the manifested traffic participant and the vehicle.

Also, the annunciation method of the present disclosure may further include prioritizing the first annunciation over the second annunciation as long as the potential collision risk continues. By giving priority to the first annunciation, priority is given to avoidance of the potential collision risk that may result in a more serious collision accident.

The foreseeing of the potential collision risk may include sensing a region in which a probability that a traffic participant is present in the direction of travel of the vehicle is high, or a region that is a blind spot to the vehicle. These regions have a higher probability for potential traffic participants to be present than other regions. Accordingly, a potential collision risk may be foreseen, assuming that such regions exist.

The foreseeing of the potential collision risk may include calculating a height of a likelihood of presence of a potential traffic participant, based on environment information. The foreseeing of the potential collision risk may also include calculating a height of a likelihood of a collision of the potential traffic participant with the vehicle, assuming that the potential traffic participant is present, based on environment information. The likelihood of the presence of potential traffic participants is affected by the environment. Further, the likelihood of collisions between potential traffic participants and vehicles is also affected by the environment. Accordingly, the accuracy of foreseeing the potential collision risk can be improved by taking the height of these likelihoods into consideration.

When the vehicle is a vehicle driven by a driver, the foreseeing of the potential collision risk may include sensing that the driver will encounter difficulty in handling the potential collision risk. In other words, even when there is a potential collision risk, the driver may be entrusted with handling the situation as long as the driver is capable of doing so.

The present disclosure also provides an annunciation device. The annunciation device according to the present disclosure includes an externally-directed annunciator that performs output toward outside of a vehicle, and a control device. The control device is configured to execute foreseeing a potential collision risk between the vehicle and a potential traffic participant predicted to be present ahead in a direction of travel of the vehicle, and performing a first annunciation using an externally-directed annunciator in response to the potential collision risk being foreseen.

Further, the present disclosure provides a storage medium. The storage medium according to the present disclosure stores instructions that are executable by one or more processors installed in a vehicle and that cause the one or more processors installed in the vehicle to perform functions including foreseeing a potential collision risk between the vehicle and a potential traffic participant predicted to be present ahead in a direction of travel of the vehicle, and performing a first annunciation, using an externally-directed annunciator installed in the vehicle, in response to the potential collision risk being foreseen.

According to the technology of the present disclosure, a potential traffic participant can be made aware of the presence of a traveling vehicle by performing the first annunciation in response to a potential collision risk being foreseen. Thus, collision accidents between potential traffic participants and vehicles can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating a system configuration example of the annunciation device according to the embodiment of the present disclosure;

FIG. 4 is a diagram illustrating an overview of an annunciation method executed by the annunciation device according to the embodiment of the present disclosure;

FIG. 5 is a diagram illustrating an overview of the annunciation method executed by the annunciation device according to the embodiment of the present disclosure;

FIG. 6 is a diagram illustrating an overview of the annunciation method executed by the annunciation device according to the embodiment of the present disclosure;

FIG. 7 is a diagram illustrating an overview of the annunciation method executed by the annunciation device according to the embodiment of the present disclosure;

FIG. 8 is a flowchart showing logic of an annunciation program for automated driving, according to the embodiment of the present disclosure;

DETAILED DESCRIPTION OF EMBODIMENTS

An embodiment of the present disclosure will be described below with reference to the drawings. It should be noted that when a numerical value such as a count, quantity, amount, range, etc. of each element is mentioned in the embodiment below, the disclosure is not limited to the mentioned numerical value unless otherwise specified in particular, or unless the numerical value is obviously limited in principle to the mentioned numerical value. Also, the structures and so forth that will be described in the following embodiment are not necessary to the disclosure unless otherwise specified in particular, or unless the structures and so forth are obviously limited in principle to the mentioned structures and so forth.

1. Configuration of Annunciation Device

First, a configuration of an annunciation device according to the present embodiment will be described. The annunciation device according to the present embodiment is applied to an automated driving vehicle capable of traveling autonomously.

Figure 1:
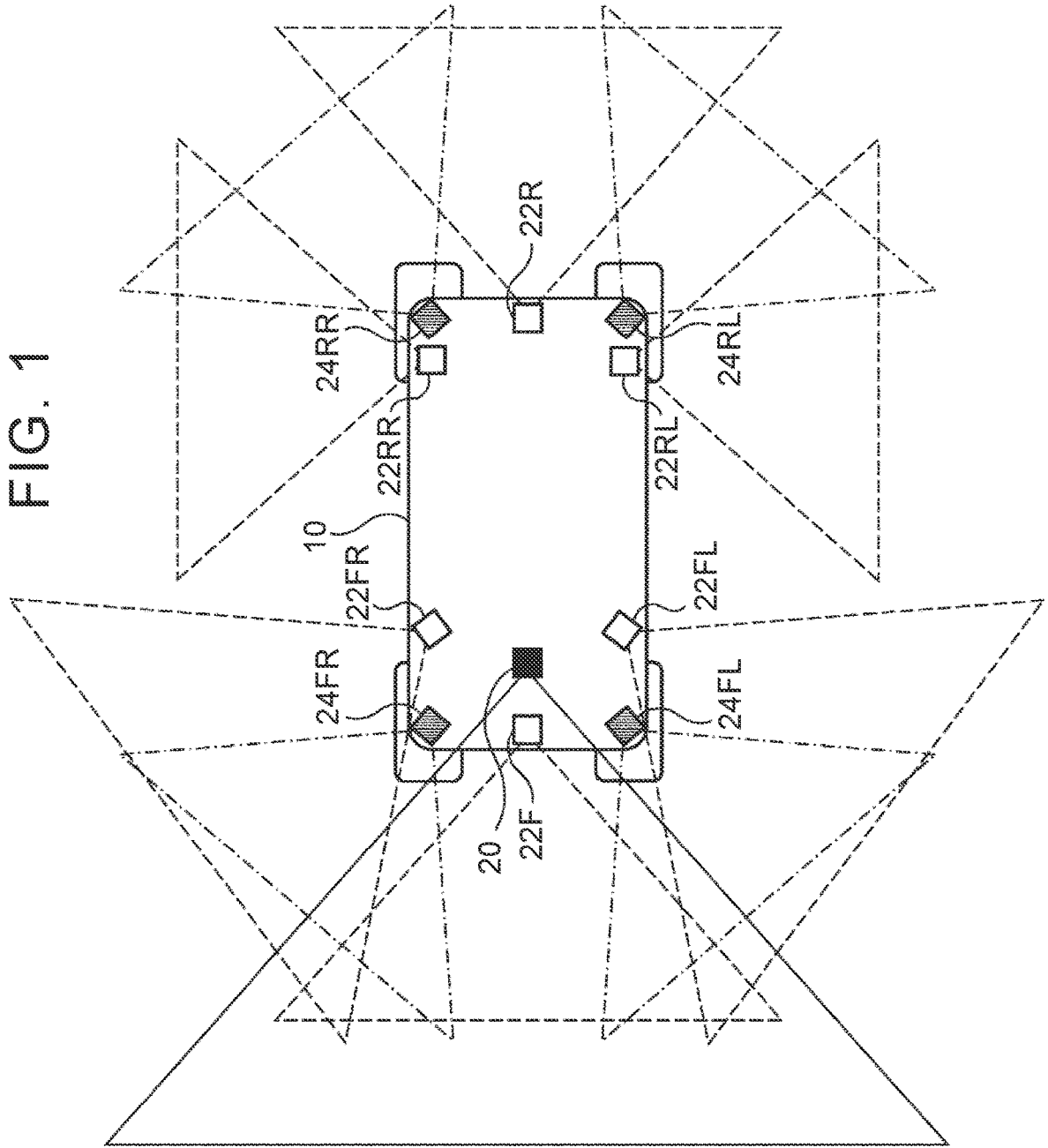
FIG. 1 is a diagram illustrating an example of installation of external sensors of a vehicle to which an annunciation device according to an embodiment of the present disclosure is applied.

FIG. 1 is a diagram illustrating an example of installation of external sensors of an automated driving vehicle 10 to which the annunciation device according to the present embodiment is applied. The automated driving vehicle 10 illustrated in FIG. 1 is a route bus or a bus-type vehicle used in on-demand traffic. The automated driving vehicle 10 will be hereinafter referred to as simply as "vehicle 10". Typical examples of external sensors installed in the vehicle 10 include cameras, Lidar (an acronym of "Laser Imaging Detection and Ranging") sensors, and radar devices. In FIG. 1, a sensing range indicated by a continuous line is an example of a sensing range of a camera, sensing ranges indicated by dashed lines are examples of sensing ranges of Lidar sensors, and sensing ranges indicated by long dashed short dashed lines are examples of sensing ranges of radar devices.

In the example illustrated in FIG. 1, a camera 20 for shooting forward is installed as an in-vehicle camera. Also, a forward Lidar sensor 22F for sensing in a forward direction, a left-forward Lidar sensor 22FL for sensing in a left-forward direction, a right-forward Lidar sensor 22FR for sensing in a right-forward direction, a rearward Lidar sensor 22R for sensing in a rearward direction, a left-rearward Lidar sensor 22RL for sensing in a left-rearward direction, and a right-rearward Lidar sensor 22RR for sensing in a right-rearward direction, are installed as in-vehicle Lidar sensors. Also, a left-forward radar device 24FL for sensing in the left-forward direction, a right-forward radar device 24FR for sensing in the right-forward direction, a left-rearward radar device 24RL for sensing in the left-rearward direction, and a right-rearward radar device 24RR for sensing in the right-rearward direction, are installed as in-vehicle radar devices.

An automated driving system of the vehicle 10 recognizes the state of the surroundings, using the multiple types of external sensors described above, and causes the vehicle 10 to autonomously travel based on recognition results thereof. Specifically, the automated driving system estimates the position thereof by comparison with map information, based on information from the Lidar sensors. The automated driving system also dynamically tracks obstructions, based on information from the radar devices and the Lidar sensors, performs fusion thereof, and distinguishes lanes based on the results of the fusion. At this time, basic recognition of three-dimensional objects is performed by the Lidar sensors, and measurement of distances to moving objects is performed by the radar devices. A travel plan for causing the vehicle 10 to safely travel in compliance with traffic regulations is created based on localization results, lane distinguishing results, map information including traveling routes, traffic light information recognized by the camera, a target route decided by an automotive navigation system, and so forth.

The automated driving system generates a target course based on the traveling plan. The target course is a travel course to be ultimately followed by the vehicle 10, and is decided taking into consideration collision with an obstruction that is situated forward of the vehicle 10 and is sensed by the external sensors. The target course includes a set of target positions of the vehicle 10 on a road where the vehicle 10 is traveling, and target speeds at the respective target positions. The automated driving system calculates deviations (lateral deviation, yaw angle deviation, speed deviation, and so forth) between the vehicle 10 and the target course, and controls steering, braking, and driving of the vehicle 10 to reduce the deviations, in order to cause the vehicle 10 to follow the target course.

The annunciation device according to the present embodiment uses the multiple types of external sensors for use in the automated driving system as information acquisition devices for acquiring information related to the state of the surroundings of the vehicle 10. Among the external sensors serving as the information acquisition devices, the Lidar sensors are mainly used for sensing three-dimensional objects in the surroundings of the vehicle 10. Note however, that cameras or radar devices may be used as sensors instead of the Lidar sensors, or cameras or radar devices may be used as sensors in combination with the Lidar sensors.

Figure 2A:
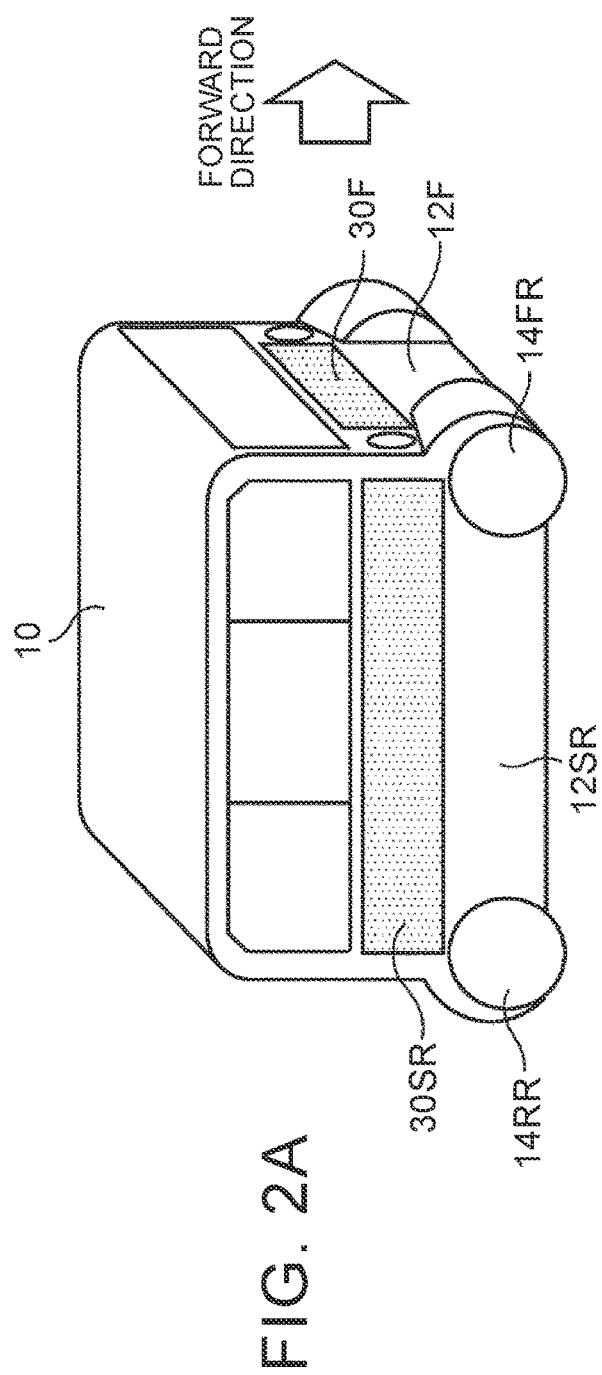
FIG. 2A is a diagram illustrating an example of installation of display panels of the vehicle to which the annunciation device according to the embodiment of the present disclosure is applied.
Figure 2B:
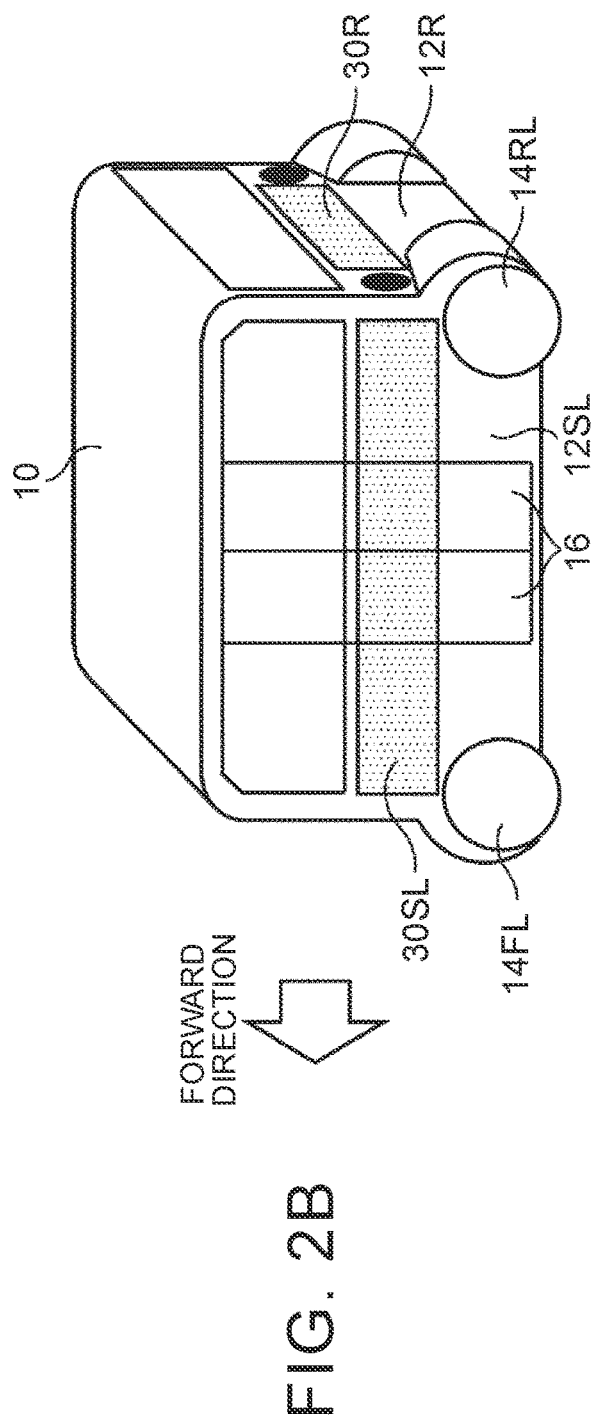
FIG. 2B is a diagram illustrating an example of installation of the display panels of the vehicle to which the annunciation device according to the embodiment of the present disclosure is applied.

The annunciation device according to the present embodiment includes an externally-directed annunciator that performs annunciation directed to the outside of the vehicle 10. In the present embodiment, the externally-directed annunciator is configured as a display panel that presents visual information. FIGS. 2A and 2B are diagrams illustrating installation examples of the display panels to the vehicle 10.

FIG. 2A schematically illustrates an external view of the vehicle 10 from the right-forward side. As illustrated in FIG. 2A, a front display panel 30F is attached to a front face 12F of the vehicle 10. The front display panel 30F is a display panel that extends in a width direction of the vehicle 10, between headlights thereof. Also, a right-side display panel 30SR is attached to a right-side face 12SR of the vehicle 10. The right-side display panel 30SR is a display panel that extends in a front-rear direction of the vehicle 10, in a range from a right front wheel 14FR to a right rear wheel 14RR.

FIG. 2B schematically illustrates an external view of the vehicle 10 from the left-rearward side. As illustrated in FIG. 2B, a rear display panel 30R is attached to a rear face 12R of the vehicle 10. The rear display panel 30R is a display panel that extends in the width direction of the vehicle 10, between taillights thereof. Also, a left-side display panel 30SL is attached to a left-side face 12SL of the vehicle 10. The left-side display panel 30SL is a display panel that extends in the front-rear direction of the vehicle 10, in a range from a left front wheel 14FL to a left rear wheel 14RL. The left-side display panel 30SL is divided into a plurality of parts at a boarding door 16.

As described above, the four display panels 30F, 30R, 30SR, and 30SL making up the externally-directed annunciator are attached so as to face in different directions from each other. Accordingly, traffic participants present in the vicinity of the vehicle 10 can view at least one of the display panels 30F, 30R, 30SR, and 30SL, from any direction. Each of the display panels 30F, 30R, 30SR, and 30SL is, for example, a display panel capable of displaying contents that can be changed, such as a liquid crystal display panel, an organic electroluminescence (EL) display panel, a light-emitting diode (LED) display panel, or the like.

FIG. 3 is a diagram illustrating a system configuration of the annunciation device according to the embodiment of the present disclosure. The annunciation device includes a control device 100. Information obtained by the multiple types of external sensors installed in the vehicle 10, i.e., the camera 20, the Lidar sensors 22F, 22FL, 22FR, 22R, 22RL, and 22RR, and the radar devices 24FL, 24FR, 24RL, and 24RR, is transmitted to the control device 100. The external sensors are connected to the control device 100 by an in-vehicle network. The display panels 30F, 30R, 30SR, and 30SL installed in the vehicle 10 are also connected to the control device 100 by the in-vehicle network. The contents displayed on the display panels 30F, 30R, 30SR, and 30SL are individually controlled based on control signals transmitted from the control device 100.

Devices such as a data communication module 42, an automotive navigation system 44, an automated/manual changeover switch 46, and so forth, are connected to the control device 100. The data communication module 42 is connected to a server via a communication network, and acquires map information necessary for automated driving, from a road features map, a tracking map, a traffic rules map, and a travel route map, which are on the server, the map information then being provided to the control device 100. The automotive navigation system 44 creates a route plan from a navigation map, and provides the route plan to the control device 100. The automated/manual changeover switch 46 is a switch for switching between automated driving and manual driving. Switching can be performed at the request of the automated driving system or by judgment of a driver him/herself.

The control device 100 is an in-vehicle computer including a processor 102 and memory 104. The control device 100 may be made up of a single electronic control unit (ECU), or may be an aggregate of a plurality of ECUs. The control device 100 may be an ECU that also serves as an ECU making up the automated driving system, or may be another ECU. The memory 104 stores various types of programs 106 that can be executed by the processor 102, and data related to the programs 106. The memory 104 here may include, in addition to memory in a narrow sense such as random access memory (RAM), a data storage device typified by a magnetic disk such as a hard disk drive (HDD), an optical disc such as a digital versatile disc (DVD), a flash memory storage device such as a solid-state drive (SSD), and so forth.

The programs 106 stored in the memory 104 include an annunciation program 110. The annunciation program 110 is a program that causes the control device 100 to execute annunciation using the in-vehicle annunciation device, i.e., the display panels 30F, 30R, 30SR, and 30SL. The annunciation program 110 includes an annunciation determination routine 112, a manifested collision risk determination routine 114, a potential collision risk determination routine 116, and a driver state risk estimation routine 118. The annunciation program 110 including these routines 112, 114, 116, and 118, is executed by the processor 102, thereby executing an annunciation method according to the present embodiment by the annunciation device.

2. Overview of Annunciation Method

Next, an overview of the annunciation method to be executed by the annunciation device according to the present embodiment will be described with reference to FIGS. 4 to 7. Note that in each of the examples illustrated in FIGS. 4 to 7, the vehicle 10 is assumed to be autonomously traveling by the automated driving system.

In the example illustrated in FIG. 4, there is an intersection 54 ahead on the road on which the vehicle 10 is traveling. Visibility of a side road connecting to the intersection 54 is poor, and a region of the side road is a blind spot to the vehicle 10. Even when a traffic participant, such as a pedestrian or a bicycle, is present in the blind spot region, the external sensors of the vehicle 10 cannot sense the traffic participant. There is a possibility that the vehicle 10 will not be able to avoid a collision with the traffic participant in a situation in which the vehicle 10 is passing through the intersection 54 and the traffic participant, who is not sensed, suddenly enters the roadway.

Accordingly, in the annunciation method according to the present embodiment, when there is the intersection 54 ahead of the vehicle 10, the control device 100 determines that a potential traffic participant 52 is present at the intersection 54. The control device 100 then determines a potential collision risk between the potential traffic participant 52 and the vehicle 10. A potential collision risk is a potentially-existing collision risk, and the potential traffic participant 52 is not a traffic participant that is actually present in front of the vehicle 10. Accordingly, collision avoidance action is not taken by the collision avoidance system installed in the vehicle 10. Thus, when foreseeing a potential collision risk, the control device 100 performs a first annunciation for avoidance of the potential collision risk. The first annunciation is annunciation for notifying those in the vicinity that the vehicle 10 is traveling. Specifically, "passing" or "starting to move" is conspicuously displayed on the display panels. By performing such a display, when the potential traffic participant 52 notices the presence of the vehicle 10, the potential traffic participant 52 can quickly recognize that the vehicle 10 is traveling, i.e., it is dangerous unless he/she stops.

In the example illustrated in FIG. 5, a pedestrian is walking ahead on the road on which the vehicle 10 is traveling. The pedestrian is a manifested traffic participant 50 whose presence is confirmed by the external sensors of the vehicle 10. Once the presence of the manifested traffic participant 50 is confirmed, a manifested collision risk between the manifested traffic participant 50 and the vehicle 10 is determined. The manifested collision risk is a collision risk that has already been manifested, and accordingly the vehicle 10 is required to take action for avoidance thereof. Hence, when a manifested collision risk is sensed, the collision avoidance system takes collision avoidance actions with respect to the manifested traffic participant 50. Specifically, the vehicle 10 decelerates toward a position short of the manifested traffic participant 50, and slows down to yield or stops when near to the manifested traffic participant 50, and starts moving when there is no longer a danger of collision.

In the annunciation method according to the present embodiment, the control device 100 performs a second annunciation for avoiding the manifested collision risk, in conjunction with the collision avoidance action by the collision avoidance system. The second annunciation is an annunciation for notifying those in the vicinity with regard to collision avoidance actions of the vehicle 10. Specifically, "decelerating" is displayed on the display panel while the vehicle 10 is decelerating, "yielding" is displayed on the display panel while the vehicle 10 is slowing down to yield, and "stopping" is displayed on the display panel while the vehicle 10 is stopped. When the vehicle 10 is going to accelerate, "accelerating" is displayed on the display panel from several seconds before accelerating. Performing such displays reduces misunderstandings in communication between the manifested traffic participant 50 and the vehicle 10.

In the example illustrated in FIG. 6, there is the intersection 54 ahead on the road on which the vehicle 10 is traveling, and the potential traffic participant 52 is hidden in the intersection 54. Also, the manifested traffic participant 50 is sensed further ahead, on the other side of the intersection 54. In this case, a potential collision risk between the potential traffic participant 52 and the vehicle 10 is foreseen, and subsequently, a manifested collision risk between the manifested traffic participant 50 and the vehicle 10 is also sensed.

In the annunciation method according to the present embodiment, the first annunciation is given with priority over the second annunciation, as long as the potential collision risk continues. In the example illustrated in FIG. 6, even at a position where "decelerating" would be displayed on the display panels when there is only a manifested collision risk, "passing" or "starting to move" is displayed on the display panels when there is a potential collision risk. Thereafter, when the vehicle 10 enters the intersection 54 and the potential collision risk is gone, the display on the display panels is switched from "passing" or "starting to move" to "decelerating". By giving priority to the first annunciation in this way, priority is given to avoidance of the potential collision risk that may result in a more serious collision accident.

In the example illustrated in FIG. 7, the manifested traffic participant 50 is sensed ahead on the road on which the vehicle 10 is traveling. Also, there is the intersection 54 further beyond the manifested traffic participant 50, and the potential traffic participant 52 is hidden in the intersection 54. In this case, a manifested collision risk between the manifested traffic participant 50 and the vehicle 10 is sensed, and subsequently, a potential collision risk between the potential traffic participant 52 and the vehicle 10 is also foreseen.

In the annunciation method according to the present embodiment, even when the second annunciation is being performed due to sensing of a manifested collision risk, priority is given to the first annunciation over the second annunciation when a potential collision risk is foreseen. In the example illustrated in FIG. 7, "decelerating" is displayed on the display panel while only the manifested collision risk is sensed. However, at the point in time that a potential collision risk is foreseen, the display on the display panel is switched from "decelerating" to "passing" or "starting to move". By giving priority to the first annunciation in this way, priority is given to avoidance of the potential collision risk that may result in a more serious collision accident.

Thus, in the annunciation method according to the present embodiment, when a potential collision risk is foreseen, the first annunciation is made to notify those in the vicinity that the vehicle 10 is traveling. In the examples illustrated in FIGS. 4, 6 and 7, "passing" or "starting to move" is displayed on the display panels as the first annunciation. When this display catches the eye of the potential traffic participant 52, the potential traffic participant 52 can instantly recognize the presence of the vehicle 10 that is traveling. Thus, collision accidents between the vehicle 10 and potential traffic participants 52 that are not visible to the vehicle 10 are reduced. Also, the first annunciation is given priority over the second annunciation as long as the potential collision risk continues, and accordingly the potential collision risk, in which a more serious collision accident may occur, is preferentially avoided.

3. Details of Annunciation Method

The annunciation method according to the present embodiment is executed by the control device 100, by the processor 102 executing the annunciation program 110. Logic of the annunciation program 110 for implementing the annunciation method according to the present embodiment will be described below.

Figure 9:
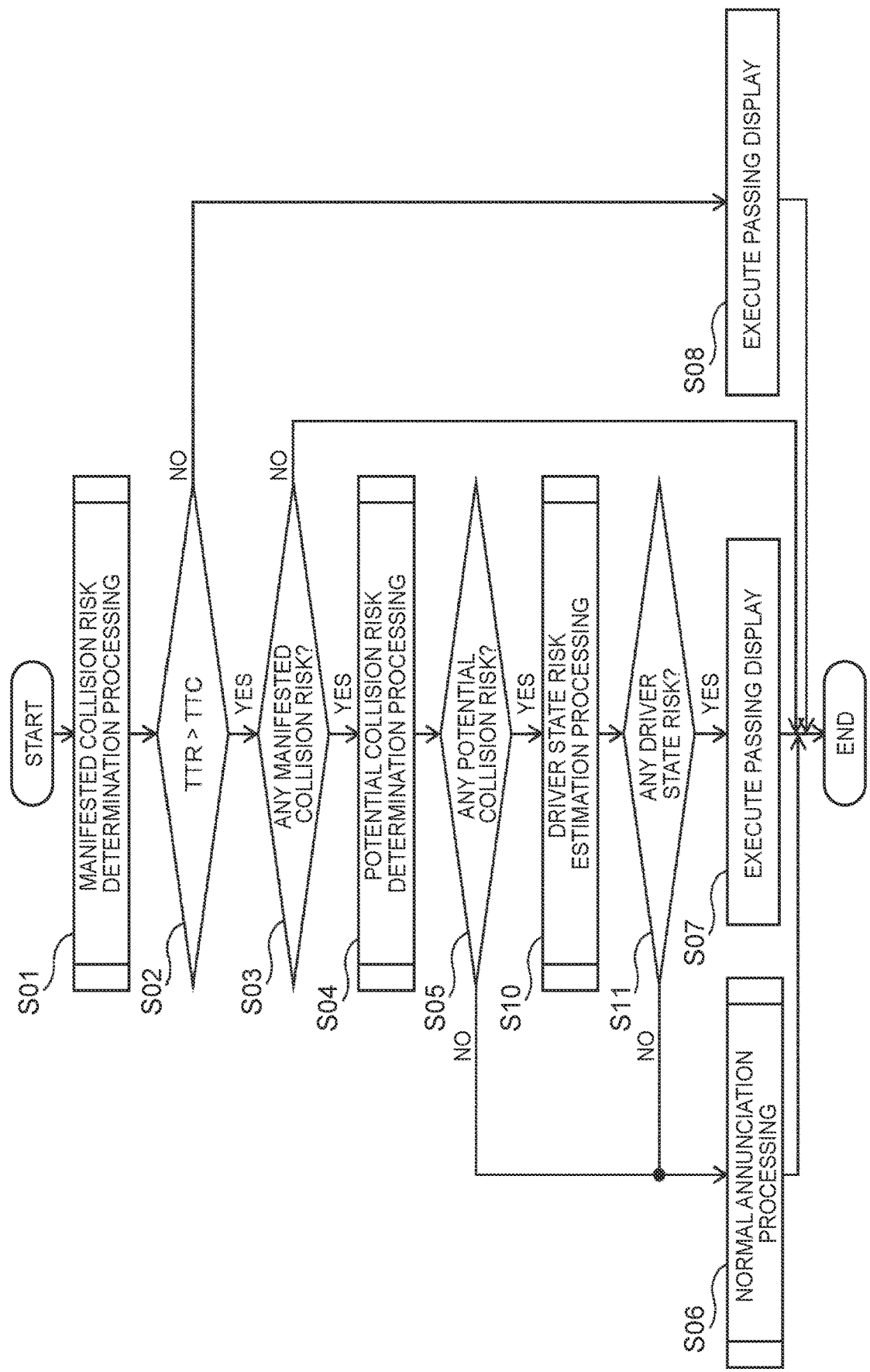
FIG. 9 is a flowchart showing logic of an annunciation program for manual driving, according to the embodiment of the present disclosure.

FIGS. 8 and 9 are flowcharts showing logic of the annunciation program 110. Of these, FIG. 8 shows logic for automated driving, and FIG. 9 shows logic for manual driving. The logic for automated driving is selected when the vehicle 10 is automatically driven by the automated driving system, and the logic for manual driving is selected when the vehicle 10 is manually driven by the driver. The logic for automated driving and the logic for manual driving have much in common, and there are only some partial differences.

First, the logic for automated driving will be explained with reference to FIG. 8. According to the flowchart shown in FIG. 8, first, in step S01, manifested collision risk determination processing is performed. The manifested collision risk determination processing is performed by the manifested collision risk determination routine 114 that is a subroutine of the annunciation program 110.

Figure 10:
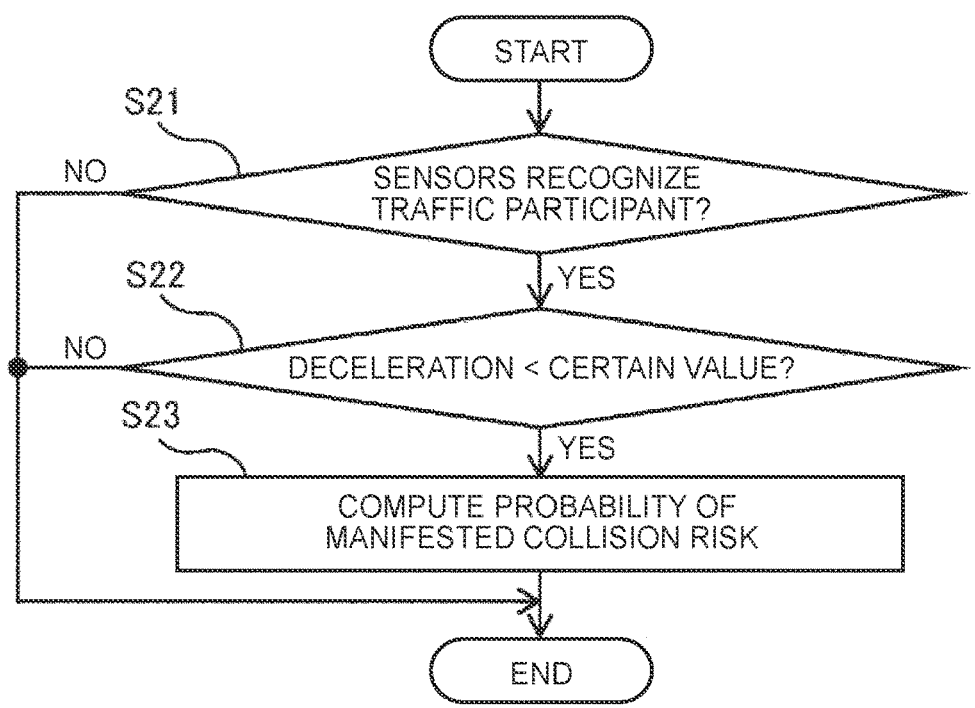
FIG. 10 is a flowchart showing logic of a manifested collision risk determination processing routine included in the annunciation program.

FIG. 10 is a flowchart showing logic of the manifested collision risk determination routine 114. According to this flowchart, first, in step S21, determination is made regarding whether the external sensors of the vehicle 10 recognize a traffic participant. When no traffic participant is recognized, determination is made that there is no manifested collision risk, and the manifested collision risk determination routine 114 ends.

When a traffic participant is recognized, determination is made in step S22 whether deceleration is below a certain value. The certain value is a limit of deceleration at which determination can be made that the vehicle 10 is decelerating due to braking. Deceleration lower than the certain value means that the vehicle 10 is decelerating due to braking. When there is a risk of collision with respect to a traffic participant that is recognized, collision avoidance actions are taken by the collision avoidance system. Accordingly, when the vehicle 10 is not decelerating, determination is made that there is no manifested collision risk, and the manifested collision risk determination routine 114 ends.

When the vehicle 10 is decelerating, probability computation of a manifested collision risk is performed in step S23. Specifically, the movement of the traffic participant over a certain amount of time thereafter is predicted from the movement of the traffic participant that is recognized. The movement of the traffic participant over a certain amount of time thereafter can be deemed to follow a Gaussian distribution that includes the influence of past movement history. The probability that the traffic participant will appear in front of the vehicle 10 is calculated from the predicted movement over the certain amount of time.

Returning to FIG. 8, description of the flowchart of the annunciation program 110 will be continued. In step S02, determination is made regarding whether sudden braking will be performed with respect to the traffic participant recognized in step S01. As a specific example, Time to Reach (TTR), which is the time until the traffic participant recognized in step S01 will arrive at the vehicle 10, and Time to Collision (TTC), which is the time until the vehicle 10 will collide with the traffic participant, are compared. When TTR is greater than TTC as a result of the comparison, determination is made that sudden braking will not be performed, and when TTR is no greater than TTC, determination is made that sudden braking will be performed. When no traffic participant is recognized in step S01, determination is made that sudden braking will not be performed.

When determination is made that sudden braking will occur, the processing of step S08 is executed. In step S08, a passing display is made. The passing display is to display "passing" or "starting to move" on the display panels. When the determination in step S02 is negative, the collision avoidance system performs sudden braking to avoid a collision. However, when the display on the display panels is set to "decelerating" or "stopping," there is a risk that the traffic participant will be relieved, and will delay avoidance actions. On the other hand, by displaying "passing" or "starting to move" on the display panels, it can be anticipated that the traffic participant will be notified of the presence of the vehicle 10 that is approaching, and will be prompted to take avoidance actions.

When determination is made in step S02 that sudden braking will not be performed, the processing of step S03 is executed. In step S03, determination is made regarding whether there is a manifested collision risk. Whether there is a manifested collision risk is determined based on the results of the probability computation of the manifested collision risk performed in step S01. When the probability value of the manifested collision risk is no less than a certain value, determination is made that there is a manifested collision risk. When determination is made that there is no manifested risk of collision, the routine ends without performing annunciation by the display panels.

When determination is made in step S03 that there is a manifested collision risk, potential collision risk determination processing is performed in step S04. The potential collision risk determination processing is performed by the potential collision risk determination routine 116 that is a subroutine of the annunciation program 110. In the potential collision risk determination routine 116, a probability value of the potential collision risk is computed.

Figure 11:
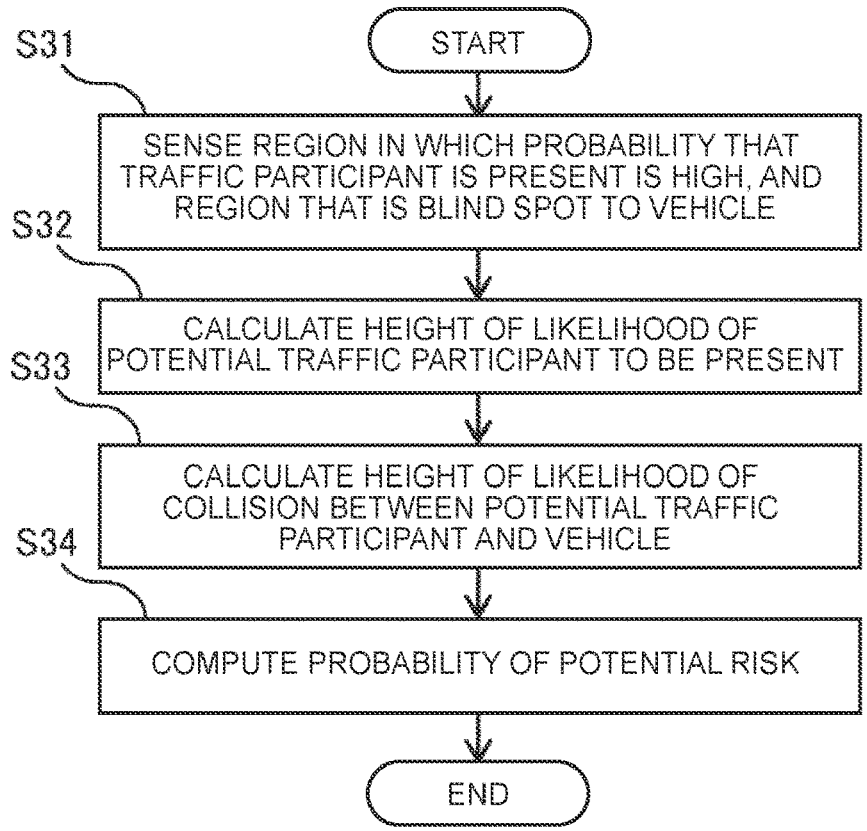
FIG. 11 is a flowchart showing logic of a potential collision risk determination processing routine included in the annunciation program.

FIG. 11 is a flowchart showing the logic of the potential collision risk determination routine 116. According to this flowchart, first, in step S31, a region in which there is a high probability that a traffic participant will be present in the direction of travel of the vehicle 10, or an area that is a blind spot from the vehicle 10, is sensed. In addition to intersections, such as in the example illustrated in FIG. 4, objects of sensing include regions where there are crosswalks, regions where there are traffic lights, regions where the road width is narrow, and so forth. These regions have a higher probability for potential traffic participants to be present than other regions. Accordingly, a base probability value of the potential collision risk is computed, assuming that such regions exist.

Next, in step S32, the height of the likelihood of potential traffic participants to be present is calculated based on environment information of the vehicle 10. The probability of presence of potential traffic participants is affected by the environment. Schools, train stations, and residential areas are examples of environments in which the probability of the presence of potential traffic participants is high. A weighting value to be applied to the base probability value is decided according to the presence or absence of schools or the like. Also, the weighting value is increased further the closer to a school or the like.

Next, in step S33, the height of the likelihood of collision between the potential traffic participant and the vehicle is calculated based on the environment information of the vehicle 10, assuming that the potential traffic participant is present. The probability of collision between the potential traffic participant and the vehicle also is affected by the environment. An example of an environment that increases the probability of a collision is a shielding object that shields from view a side street connecting to an intersection. A weighting value to be applied to the base probability value is decided according to the presence or absence of a shielding object. Also, the weighting value is increased when the height of the shielding object is no less than a certain value.

Then, in step S34, the probability of a potential traffic participant who is not visible to the vehicle 10 appearing in front of the vehicle 10 is calculated based on the calculation results of steps S31 to S33. Specifically, the probability value of the potential collision risk is computed by multiplying the weighting values calculated in steps S32 and S33 by the base value calculated in step S31.

Returning to FIG. 8, description of the flowchart of the annunciation program 110 will be continued. In step S05, determination is made regarding whether there is a potential collision risk. Whether there is a potential collision risk is determined based on the results of the probability computation of the potential collision risk performed in step S04. When the probability value of the potential collision risk is no less than a certain value, determination is made that there is a potential collision risk.

When determination is made that there is no potential collision risk, the processing of step S06 is executed. In step S06, normal annunciation processing is performed to handle the manifested collision risk. Normal annunciation processing is performed by an annunciation determination routine 112 that is a subroutine of the annunciation program 110. In the annunciation processing by the annunciation determination routine 112, the display on the display panel is changed from "decelerating" to "yielding" or "stopping", and further changed to "accelerating", in accordance with the distance between the vehicle 10 and the manifested traffic participant (see FIG. 5).

When determination is made that there is a potential collision risk, the processing of step S07 is executed. In step S07, a passing display is executed to display "passing" or "starting to move" on the display panel. By performing such a "passing" or "starting to move" display on the display panels, when the potential traffic participant 52 notices the presence of the vehicle 10, the potential traffic participant 52 can quickly recognize that the vehicle 10 is traveling, i.e., it is dangerous unless he/she stops.

Next, the logic for manual driving will be described with reference to FIG. 9. The difference between the logic for manual driving and the logic for automated driving is that the processing of steps S10 and S11 are added. According to the flowchart shown in FIG. 9, when determination is made that there is a potential collision risk in step S05, the processing of step S07 is not executed immediately, and driver state risk estimation processing is performed in step S10. The driver state risk estimation processing is performed by the driver state risk estimation routine 118 that is a subroutine of the annunciation program 110.

Figure 12:
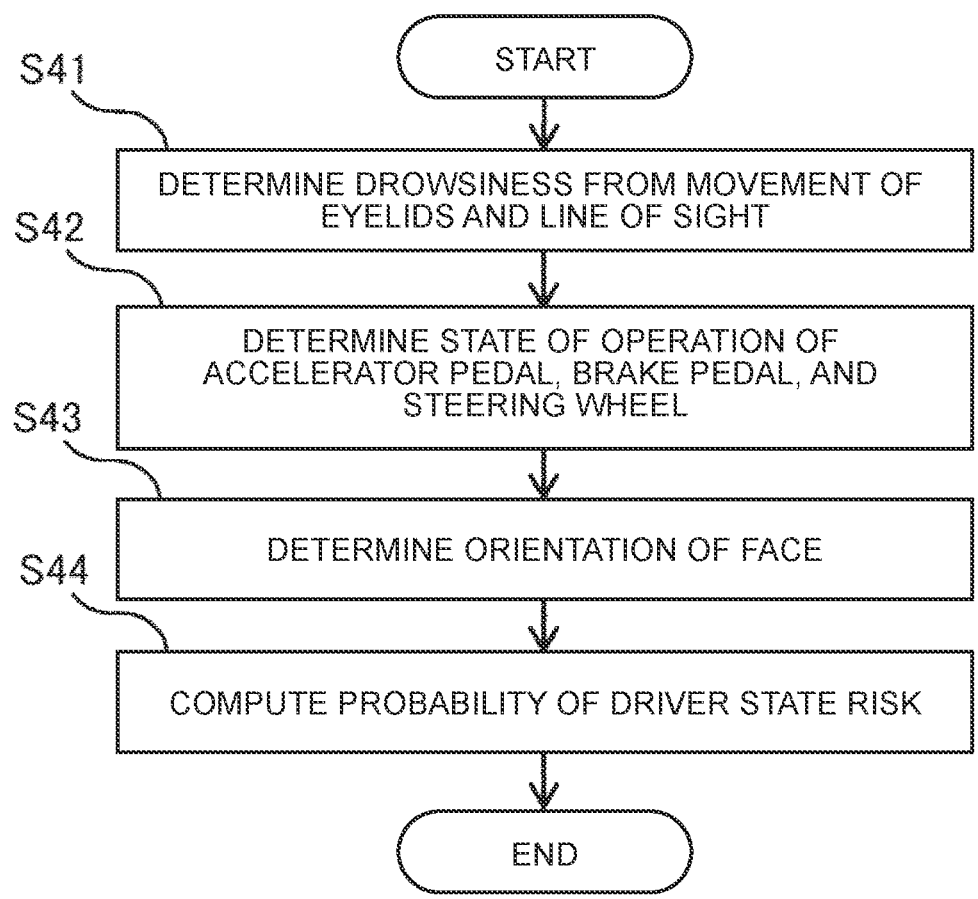
FIG. 12 is a flowchart showing logic of a driver state risk determination processing routine included in the annunciation program.

FIG. 12 is a flowchart showing logic of the driver state risk estimation routine 118. According to this flowchart, in step S41, drowsiness of the driver is determined from movement of the eyelids and the line of sight of the driver. Also, in step S42, each state of operation of an accelerator pedal, a brake pedal, and a steering wheel, performed by the driver is determined, and in step S43, the orientation of the face of the driver is determined. Then, in step S44, probability computation of the driver state risk is performed, based on the determination results of steps S41 to S43. The driver state risk means the risk that it is difficult for the driver to handle the potential collision risk.

Returning to FIG. 9, description of the flowchart of the annunciation program 110 will be continued. In step S11, determination is made regarding whether there is a driver state risk. Whether there is a driver state risk is determined based on the results of the probability computation of the driver state risk performed in step S10. When the probability value of the driver state risk is no less than a certain value, determination is made that there is a driver state risk.

When determination is made that there is no driver state risk, the processing of step S06 is executed. That is to say, even when determination is made in step S05 that there is a potential collision risk, normal annunciation processing is performed as long as the driver is in a state of being capable of handling the potential collision risk. In other words, during manual driving, even when there is a potential collision risk, the driver is entrusted with handling the situation as long as the driver is capable of doing so.

When determination is made that there is a driver state risk, the processing of step S07 is then executed. That is to say, when determination is made in step S05 that there is a potential collision risk and the driver is in a state where handling of the potential collision risk is difficult, the passing display of "passing" or "starting to move" is made on the display panels. During manual driving, foreseeing of a potential collision risk includes that the driver will encounter difficulty in handling thereof, and the first annunciation is performed only when the driver will encounter difficulty in handling the situation.

The processor 102 executes the annunciation program 110 of the contents described above according to a predetermined execution cycle, whereby the annunciation method according to the present embodiment is executed by the control device 100 that makes up the annunciation device. By executing the annunciation method according to the present embodiment, the first annunciation is performed in response to foreseeing a potential collision risk. This enables the potential traffic participant to be aware of the presence of the vehicle that is traveling, thereby reducing collision accidents between vehicles and potential traffic participants that are not visible from the vehicle.

4. Others

The annunciation device according to the embodiment described above is applied to bus-type automated driving vehicles. However, the automated driving vehicle to which the annunciation device according to the present disclosure is applied may be, for example, a privately owned vehicle, a ride-share vehicle in which multiple people ride together, or a public transportation vehicle such as a bus or a taxi. Furthermore, the annunciation device according to the present disclosure is also applicable to remotely operated vehicles that are remotely driven by a remote operator.

Also, although the annunciation device according to the above embodiment includes the display panels, an audio output device having one or more speakers may be used as the annunciator. That is to say, annunciation by sound may be performed. For example, an audio output device having a plurality of directional speakers pointing in different directions may be provided, with annunciation being performed limiting the first annunciation to the direction of the potential traffic participant. The annunciation using the display panel and the annunciation using the audio output device may be performed together.

The annunciation device according to the embodiment described above acquires information related to the state of the surroundings of the vehicle by the in-vehicle external sensors. However, information of the state of the surroundings may be acquired by road-to-vehicle communication with infrastructure equipment, vehicle-to-vehicle communication with other vehicles, or pedestrian-to-vehicle communication with pedestrians.

What is claimed is:

1. An annunciation method comprising:
   determining, by a processor, whether a traffic participant is recognized based on sensor data associated with a vehicle;
   upon determination that the traffic participant is recognized, determine, by the processor, whether a first time for the traffic participant to reach the vehicle is greater than a second time until the vehicle will collide with the traffic participant;
   upon determination that the first time is not greater than the second time, display a passing display on a display panel associated with the vehicle;
   upon determination that the first time is greater than the second time, determine, by the processor, whether a probability of collision between the vehicle and the traffic participant is greater than a first predetermined threshold based on the sensor data;
   upon determination that the probability of collision between the vehicle and the traffic participant is greater than the first predetermined threshold, determine, by the processor, whether a blind spot is detected in a direction of travel of the vehicle based on the sensor data;
   upon determination that the blind spot is detected in the direction of travel of the vehicle, determine, by the processor, whether there is a potential collision risk based on an environment of the blind spot; and
   upon determination that there is the potential collision risk, display the passing display on the display panel associated with the vehicle.

2. The annunciation method according to claim 1, further comprising:
   sensing a manifested collision risk between the vehicle and a manifested traffic participant of which presence is confirmed ahead in the direction of travel of the vehicle;
   performing a second annunciation notifying those in the vicinity regarding collision avoidance actions of the vehicle, using the externally-directed annunciator, in response to the manifested collision risk being sensed; and
   prioritizing the first annunciation over the second annunciation as long as the potential collision risk continues.

3. The annunciation method according to claim 1, wherein the foreseeing of the potential collision risk includes sensing a region in which a probability that a traffic participant is present in the direction of travel of the vehicle is high, or a region that is a blind spot to the vehicle.

4. The annunciation method according to claim 3, wherein the foreseeing of the potential collision risk includes calculating a height of a likelihood of presence of the potential traffic participant, based on environment information.

5. The annunciation method according to claim 3, wherein the foreseeing of the potential collision risk includes calculating a height of a likelihood of a collision of the potential traffic participant with the vehicle, assuming that the potential traffic participant is present, based on environment information.

6. The annunciation method according to claim 1, wherein:
   the vehicle is a vehicle driven by a driver; and
   the foreseeing of the potential collision risk includes sensing that the driver will encounter difficulty in handling the potential collision risk.

7. An annunciation device comprising:
   an externally-directed annunciator that performs output toward outside of a vehicle; and
   a processor configured to execute
   determining whether a traffic participant is recognized based on sensor data associated with a vehicle;
   upon determination that the traffic participant is recognized, determine whether a first time for the traffic participant to reach the vehicle is greater than a second time until the vehicle will collide with the traffic participant;
   upon determination that the first time is not greater than the second time, display a passing display on a display panel associated with the vehicle;
   upon determination that the first time is greater than the second time, determine whether a probability of collision between the vehicle and the traffic participant is greater than a first predetermined threshold based on the sensor data;
   upon determination that the probability of collision between the vehicle and the traffic participant is greater than the first predetermined threshold, determine whether a blind spot is detected in a direction of travel of the vehicle based on the sensor data;
   upon determination that the blind spot is detected in the direction of travel of the vehicle, determine whether there is a potential collision risk based on an environment of the blind spot; and
   upon determination that there is the potential collision risk, display the passing display on the display panel associated with the vehicle.

8. The annunciation device according to claim 7, further comprising an external sensor for detecting a state of surroundings of the vehicle, wherein
   the external sensor detects a manifested traffic participant present ahead in a direction of travel of the vehicle, and
   the processor
   senses a manifested collision risk between the manifested traffic participant and the vehicle,
   performs a second annunciation notifying those in the vicinity regarding collision avoidance actions of the vehicle, using the externally-directed annunciator, in response to the manifested collision risk being sensed, and
   prioritizes the first annunciation over the second annunciation as long as the potential collision risk continues.

9. The annunciation device according to claim 7, wherein the processor performs the foreseeing of the potential collision risk by sensing a region in which a probability that a traffic participant is present in the direction of travel of the vehicle is high, or sensing a region that is a blind spot to the vehicle.

10. The annunciation device according to claim 8, wherein the processor performs the foreseeing of the potential collision risk by calculating a height of a likelihood of presence of the potential traffic participant, based on environment information.

11. The annunciation device according to claim 8, wherein the processor performs the foreseeing of the potential collision risk by calculating a height of a likelihood of a collision of the potential traffic participant with the vehicle, assuming that the potential traffic participant is present, based on environment information.

12. A non-transitory storage medium storing instructions that are executable by one or more processors installed in a vehicle and that cause the one or more processors installed in the vehicle to perform functions comprising:

determining whether a traffic participant is recognized based on sensor data associated with a vehicle;

upon determination that the traffic participant is recognized, determine whether a first time for the traffic participant to reach the vehicle is greater than a second time until the vehicle will collide with the traffic participant;

upon determination that the first time is not greater than the second time, display a passing display on a display panel associated with the vehicle;

upon determination that the first time is greater than the second time, determine whether a probability of collision between the vehicle and the traffic participant is greater than a first predetermined threshold based on the sensor data;

upon determination that the probability of collision between the vehicle and the traffic participant is greater than the first predetermined threshold, determine whether a blind spot is detected in a direction of travel of the vehicle based on the sensor data;

upon determination that the blind spot is detected in the direction of travel of the vehicle, determine whether there is a potential collision risk based on an environment of the blind spot; and upon determination that there is the potential collision risk, display the passing display on the display panel associated with the vehicle.

13. The non-transitory storage medium according to claim 12, wherein the foreseeing of the potential collision risk includes sensing a region in which a probability that a traffic participant is present in the direction of travel of the vehicle is high, or a region that is a blind spot to the vehicle.

14. The non-transitory storage medium according to claim 13, wherein the foreseeing of the potential collision risk includes calculating a height of a likelihood of presence of the potential traffic participant, based on environment information.

15. The non-transitory storage medium according to claim 13, wherein the foreseeing of the potential collision risk includes calculating a height of a likelihood of a collision of the potential traffic participant with the vehicle, assuming that the potential traffic participant is present, based on environment information.

* * * * *